Dec. 18, 1934. H. E. WANER 1,984,507
VARIABLE SPEED DRIVE
Filed April 26, 1932  2 Sheets-Sheet 1
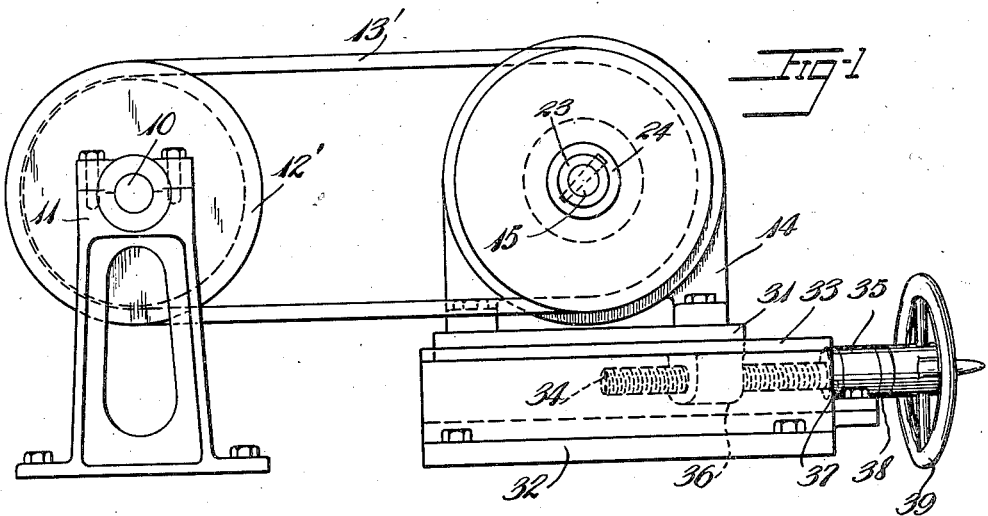
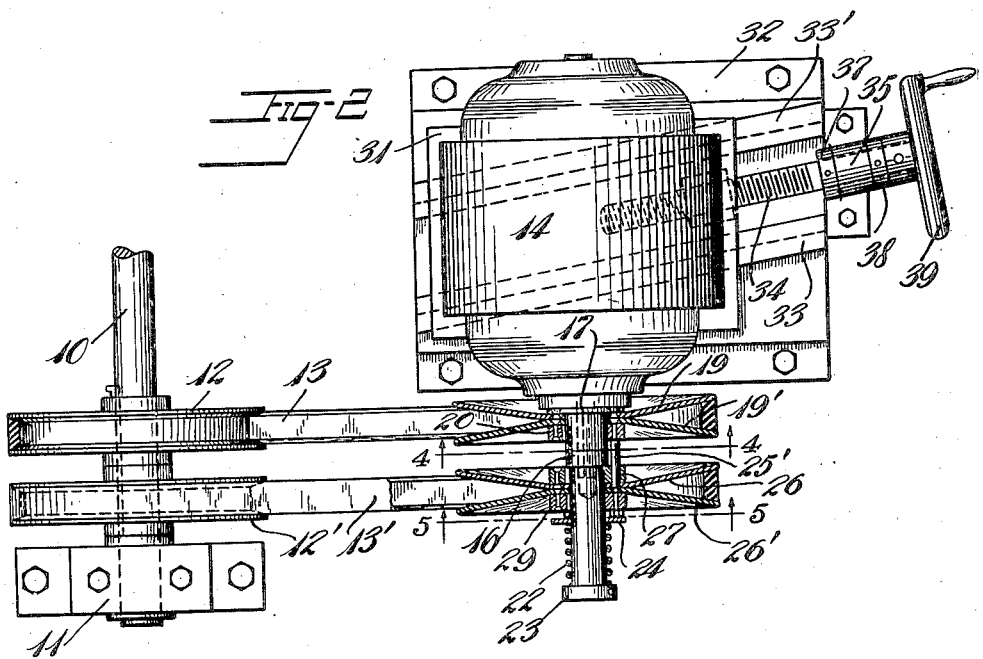
Inventor
Harry E. Waner
By Eakin & Avery
Attys.

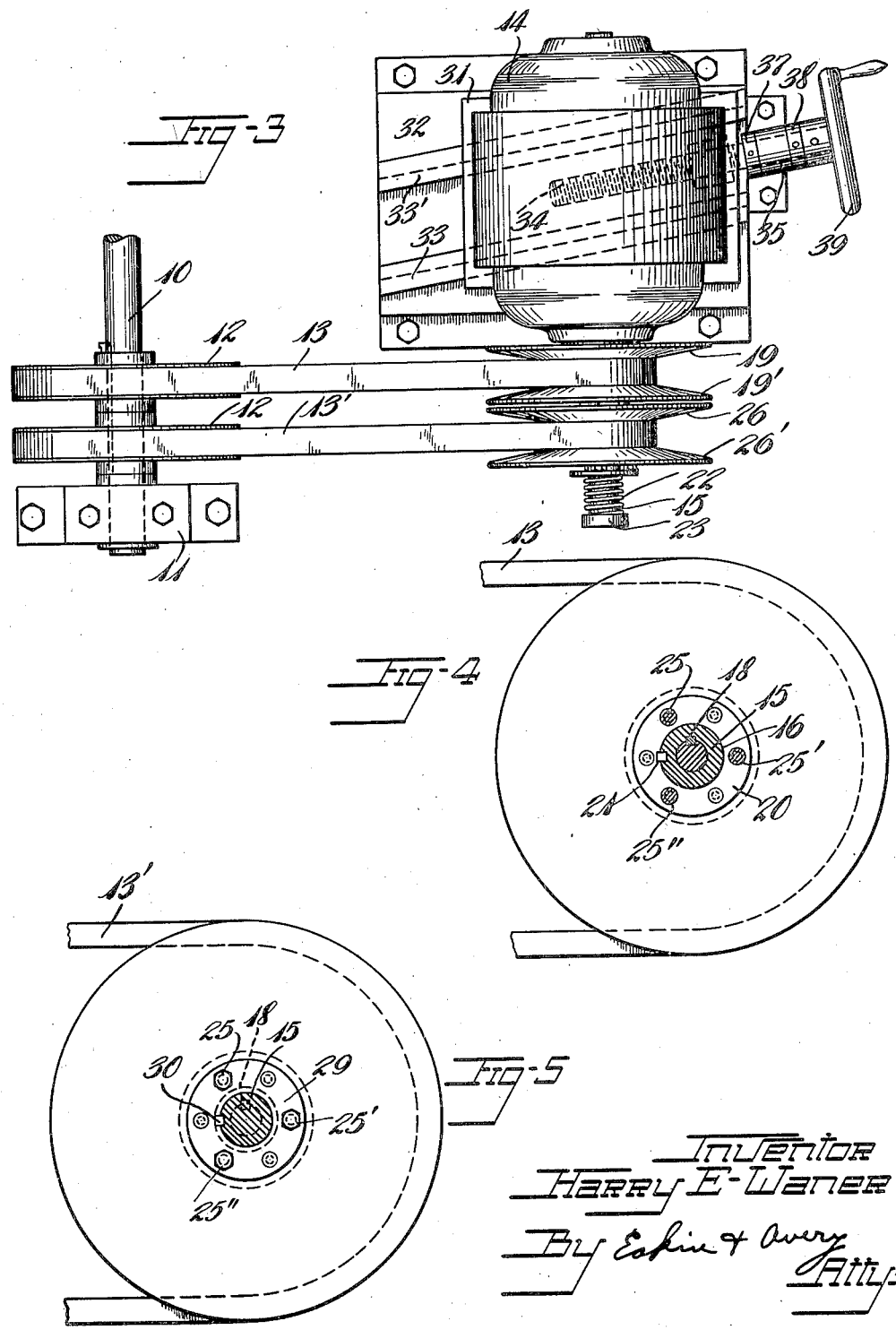

Patented Dec. 18, 1934

1,984,507

UNITED STATES PATENT OFFICE 1,984,507

VARIABLE SPEED DRIVE

Harry E. Waner, Akron, Ohio, assignor to The B. F. Goodrich Company, New York, N. Y., a corporation of New York Application April 26, 1932, Serial No. 607,656

2 Claims. (Cl. 64—8)

This invention relates to variable speed drives and especially to that type of drive in which one of the driving members laterally engages one or more flexible belts and comprises adjustable substantially conical driving flanges.

The principal objects of the invention are to provide efficient transmission of power at variable speeds, to provide simplicity in construction and adjustment, and automatic alignment of the belts.

Other objects will appear from the following description and the accompanying drawings.

In the drawings:

Fig. 1 is a side elevation of the variable speed drive.

Fig. 2 is a plan view of the same showing the driving pulleys and the belts in section, the device being so adjusted as to provide maximum speed.

Fig. 3 is a plan view similar to Fig. 2, but not in section, the device being adjusted to provide minimum speed.

Fig. 4 is a detail sectional view on line 4—4 of Fig. 2, showing one of the drive pulleys and a portion of the belt.

Fig. 5 is a detail section on line 5—5 of Fig. 2 also showing one of the drive pulleys and a portion of the belt.

Referring to the drawings, the numeral 10 designates a driven shaft which is mounted in a bearing 11 and is provided with one or more pulleys 12, 12' fixed thereto. Pulleys 12, 12' are grooved to accommodate driving belts 13, 13' with which they preferably make only lateral driving contact.

An electric motor or other prime mover 14 is adjustably mounted with its shaft 15 parallel to shaft 10. A sleeve 16 having a flange 17 is fixed to shaft 15 by a key 18. A conical driving disc 19 is riveted to or otherwise fastened to said flange. A similar conical driving disc 19' facing in the opposite direction is fastened to a collar 20 mounted to slide freely on sleeve 16 but keyed thereto against relative rotation by a feather key 21, the two driving discs comprising a driving pulley adapted to drive the belt 13 by lateral engagement therewith.

A compression coil spring 22 encircles shaft 15 between a collar 23 fixed thereon and a floating collar 24. A plurality of pressure pins 25, 25', 25'', each having one end mounted in collar 20, are disposed parallel to shaft 15 with their opposite end impinging against floating collar 24.

Where it is desired to use two belts, a second pair of driving discs are provided, one of which, designated 26, is mounted on a collar 27 fixed to shaft 15 and the other of which, 26', is attached to a collar 29 slidably mounted on a feather key 30. Pins 25, 25', 25'', previously described, have their outer ends fastened to collar 29 and pass through clearance openings in collar 27. With this arrangement it will be seen that discs 19 and 26 are fixed to shaft 15 in spaced relation whereas discs 19' and 26' are movable along the shaft in spaced relation and movement of both is resisted by spring 22.

Motor 14 is mounted on a plate 31 adapted to slide on a base 32. For this purpose base 32 is provided with guide rails 33, 33' angularly disposed to the axis of shaft 15 by an angle equal to the angularity of discs 19 and 26. Plate 31 is provided with a cooperating dove-tail guideway. An adjusting screw 34 is journaled in a bearing 35 mounted on base 32 and its threaded portion extends between rails 33, 33', parallel thereto, and engages a threaded opening in a lug 36 on plate 31. Collars 37 and 38 fixed to screw 34 prevent lengthwise movement of screw 34 in bearing 35 and a hand-wheel 39 is provided on the extending end of the screw for manual adjustment thereof.

Due to the arrangement of the parts as described, the motor 14 may be moved toward and away from shaft 10, and its shaft 15 will always be in parallelism with shaft 10. As motor 14 is moved away from shaft 10, the belts 13 and 13', being substantially inextensible and having angular side driving faces, are placed under such tension as to force the driving discs 19' and 26' away from discs 19 and 26 allowing the belts to ride deeper between the discs and thereby changing the speed ratio between shafts 15 and 10. As the rails 33, 33' are at the same angularity as the discs 19 and 26 the alignment of the belts with pulleys 12, 12' is not disturbed and consequently pulleys 12 and 12' may be of the side driving V type and all the advantages of a multiple V-belt drive are attained with the additional advantage of variable speed adjustment.

As motor 14 is moved toward shaft 10, the spring 22 causes the discs 19' and 26' to move toward discs 19 and 26 and the belts 13, 13' assume a higher position between the discs resulting in a change in speed ratio.

I claim:

1. Variable speed mechanism comprising a drive shaft, a driven shaft, one of said shafts being provided with fixed multiple grooved pulley means, an adjustable multiple grooved pulley mounted on the other shaft and comprising a set of fixed flanges and opposed thereto a set of yieldably movable flanges, said movable flanges being positively connected to each other for simultaneous and uniform movement, a plurality of belts engaging respective aligned grooves in said pulleys, and sliding means angularly disposed to said shafts for adjusting the distance therebetween and thereby causing lateral movement of the movable flanges to adjust the speed ratio while maintaining alignment of the belts.

2. Variable speed mechanism comprising a drive shaft, a driven shaft, one of said shafts being provided with multiple grooved pulley means, a plurality of conical discs fixed to the other shaft, a plurality of opposing discs slidably mounted on the shaft and collectively movable therealong defining with said fixed discs a plurality of belt engaging grooves, yielding means for simultaneously and automatically maintaining said slidably mounted discs in close relation to said fixed discs, means for holding said slidably mounted discs in fixed relation to each other, a plurality of belts engaging the grooves in said pulley means and the grooves defined by said discs, and slide means angularly disposed to said shafts for adjusting the spacing of said shafts to effect their speed ratio while maintaining alignment of the belt engaging means.

HARRY E. WANER.